United States Patent [19]

Tatsumi

[11] 4,283,751
[45] Aug. 11, 1981

[54] VARIABLE CAPACITOR

[75] Inventor: Tetsuo Tatsumi, Nagaokakyo, Japan

[73] Assignee: Murata Manufacturing Co., Ltd., Japan

[21] Appl. No.: 24,022

[22] Filed: Mar. 26, 1979

[30] Foreign Application Priority Data

Mar. 27, 1978 [JP] Japan .............................. 53-39548[U]

[51] Int. Cl.³ .............................................. H01G 5/06
[52] U.S. Cl. .................................... 361/293; 361/292
[58] Field of Search ................................ 361/292, 293

[56] References Cited

U.S. PATENT DOCUMENTS 3,588,642 11/1969 Fabricius ............................... 361/293
4,101,951 7/1978 Kuze ..................................... 361/293

FOREIGN PATENT DOCUMENTS 527339 7/1956 Canada .................................... 361/293
918826 10/1954 Fed. Rep. of Germany ........... 361/293
1138163 10/1962 Fed. Rep. of Germany ........... 361/293

Primary Examiner—E. A. Goldberg
Attorney, Agent, or Firm—Ostrolenk, Faber, Gerb & Soffen

[57] ABSTRACT

A variable capacitor includes a container-like cylindrical casing in which a dielectric plate is rigidly placed on the bottom of the casing. A surface of the dielectric plate which is in contact with the bottom of the casing is laminated with a film of conductive material which is in turn connected to a terminal leg extending outwards from a cylindrical wall of the casing. A disc shaped rotator member is rotatably accommodated inside the casing and is enclosed by a cap member applied to the open end of the casing. A spring is provided between the rotator member and the cap member for urging the rotator member towards the dielectric plate. Another terminal leg extends from the cap member for the external connection.

11 Claims, 13 Drawing Figures

VARIABLE CAPACITOR

BACKGROUND OF THE INVENTION

The present invention relates to a variable capacitor.

Conventionally, there have been proposed various types of variable capacitor, one of which is illustrated in FIG. 1 in cross-sectional view. The conventional variable capacitor shown in FIG. 1 includes a cylindrical cap member 1 made of an insulating material, open at one end 1a and provided at the other end with a small circular opening 1b, a disc shaped non-metallic elastic plate 2; a disc shaped terminal 3 having a leg 3a for an external electrical connection; a disc shaped rotatable electrode 4; a disc shaped dielectric plate 5; and a semi-circular stator electrode 6 having a leg 6a for an external electrical connection. A disc shaped stator plate 7 is tightly inserted into the cap member 1 in such a manner as to fill the portion of the interior of the cap member 1 below the plate 5. The cap member 1 is closed by a base plate 8 made of insulating material and having an opening 8a for the insertion of the leg 3a therethrough and an opening 8b for the insertion of the leg 6a therethrough.

The elastic plate 2 and the disc shaped terminal 3 have circular openings coaxial with the circular opening 1b while the rotatable electrode 4 has a groove 4a formed on its upper surface for receiving the tip of a screwdriver. When a screwdriver is inserted in groove 4a and rotated, the rotatable electrode 4 is rotated to change the position of a concavity 4b, formed on the lower surface of the rotatable electrode 4, thereby changing the electric capacitance between the rotatable electrode 4 and the stator electrode 6.

A variable capacitor of the above design can be damaged. By way of example, when a printed circuit is soldered to legs 3a and 6a, soldering flux tends to flow along one or both of the legs 3a and 6a into the interior of the cap 1 through the respective openings 8a and 8b.

In order to prevent such damage, it is conventional to provide a plate or a coating 9 of synthetic resin to the exterior surface of plate 8. This requires extra steps more components to construct the variable capacitor, as well as many adjustments. Thus, the conventional variable capacitor has a high manufacturing cost.

Moreover, since the dielectric plate 5 is bonded neither to the rotatable electrode 4, to the stator electrode 6 nor to the stator 7, the dielectric plate 5 can rotate together with the rotatable electrode 4. During its rotation, the dielectric plate 5 is susceptible to cracking or chipping-off.

In addition, since the dielectric plate 5 is manufactured separately from the stator electrode 6 and stator plate 7, the surface of the stator electrode 6 and plate 7 facing the dielectric plate 5 must be smooth. In view of this, the upper surface of the stator plate 7 and of the stator electrode 6, which contact the dielectric plate 5, should be finished smooth by means of lapping or a comparable technique. Moreover, since the stator plate 7 and the stator electrode 6 are made of different materials, the surface of the stator may be uneven at the joint between the stator plate 7 and the stator electrode 6 due to the difference between their thermal expansion coefficients.

SUMMARY OF THE INVENTION

Accordingly, an important object of the present invention is to provide an improved variable capacitor which is simple in construction and can be easily manufactured at low cost.

Another object of the present invention is to provide an improved variable capacitor of the above described type wherein there is no possibility of invasion of a soldering flux into the cap.

Yet another object of the present invention is to provide an improved variable capacitor of the above described type which can be manufactured with a minimum possible number of component parts.

A further object of the present invention is to provide an improved variable capacitor of the above described type, the dielectric element used in which cannot easily be damaged.

Still another object of the present invention is to provide an improved variable capacitor of the above described type wherein the stator has a smooth surface adapted to contact a rotatable member.

In accordance with the invention, a variable capacitor comprises a stator member, which includes a dielectric plate having a film of electrically conductive material and a first elongated terminal plate having one end thereof electrically connected to the film. A cylindrical casing made of electrically non-conductive material and having a bottom wall and a cylindrical wall is provided for positioning the stator member, particularly the dielectric plate, inside the casing. The dielectric plate is rigidly placed, during the molding of the casing, on the bottom wall of the casing with one flat surface of the dielectric plate held in contact with the bottom wall and with the elongated terminal plate extending outwardly from the casing through the cylindrical wall.

The variable capacitor according to the present invention further comprises a disc shaped rotator member made of electrically conductive material and having first and second flat surfaces. This rotator member is rotatably accommodated in the casing with the first surface thereof being held in contact with the opposite flat surface of the dielectric plate. A cap member made of electrically conductive material is applied to the open end of the cylindrical casing, to enclose the rotator member inside the casing. An urging means is positioned between the cap member and the rotator member for urging the rotator member against the dielectric plate. For the external electrical connection, a second elongated terminal plate is electrically connected to the cap member, from which it projects radially.

BRIEF DESCRIPTION OF THE DRAWINGS

These and other objects and features of the present invention will become apparent from the following description taken in conjunction with the accompanying drawings, in which:

FIG. 3 is a view similar to FIG. 10, but particularly showing a modification thereof.

DETAILED DESCRIPTION OF THE INVENTION

Figure 1:
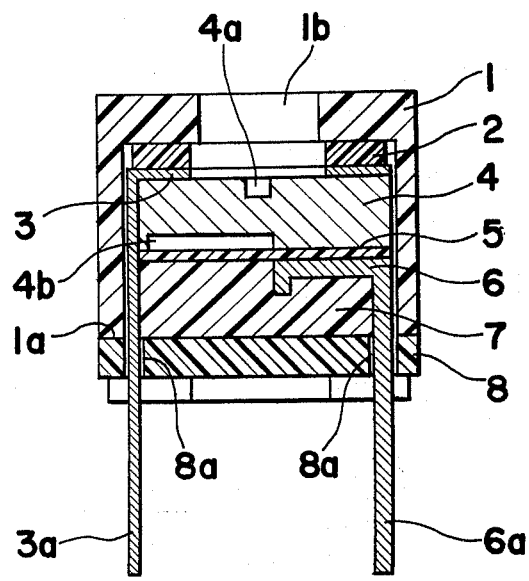
FIG. 1 is a longitudinal sectional view of the prior art variable capacitor, reference to which has already been made.

Before the description of the present invention proceeds, it is to be noted that like parts are designated by like reference numerals throughout the accompanying drawings.

Figure 3:
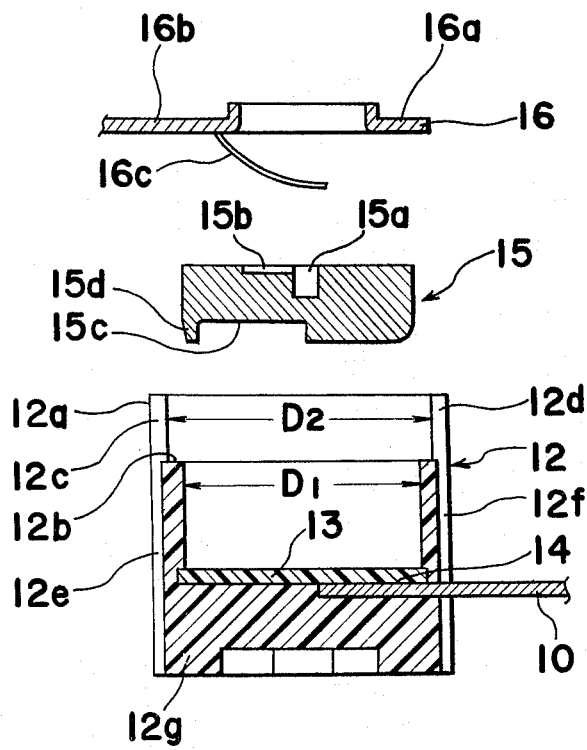
FIG. 3 is a cross-sectional view taken along a line III—III shown in FIG. 2.
Figure 2:
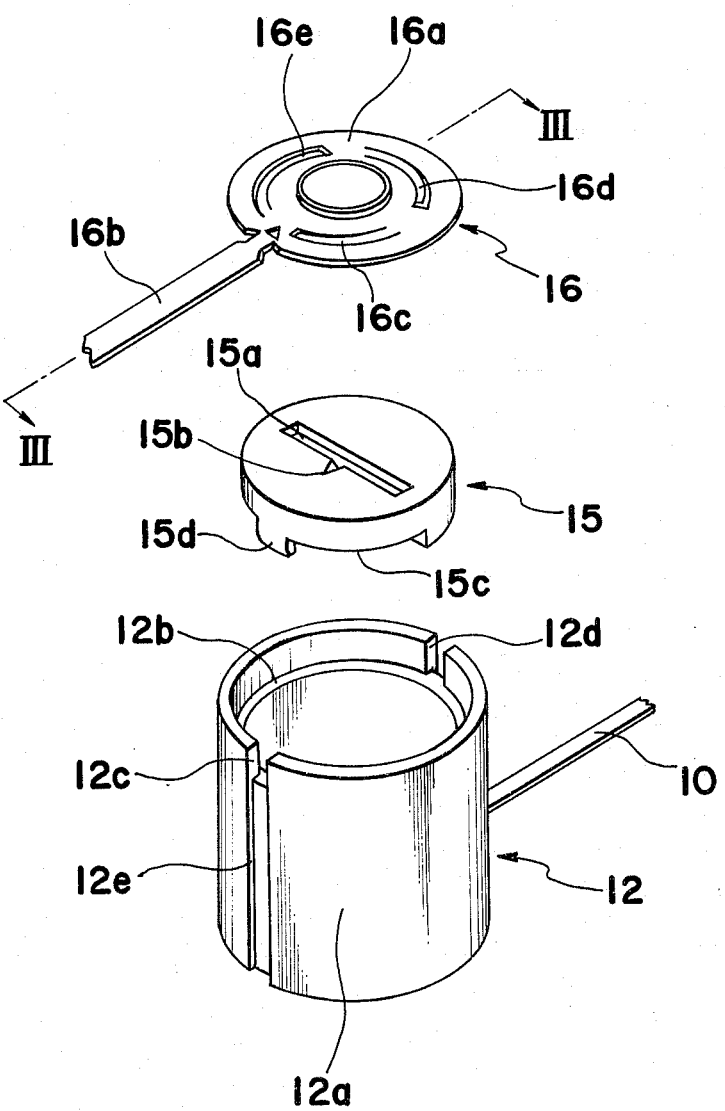
FIG. 2 is an exploded view of a variable capacitor according to one embodiment of the present invention.

Referring to FIGS. 2 and 3, a variable capacitor of the present invention can be divided into three major parts, as best shown in FIG. 2: a casing 12 assembled together with a stator member, a rotator member 15 and a cap member 16.

The casing 12 is made of an insulating material such as glass-fiber-reinforced plastics and has a cylindrical side wall 12a and a bottom wall 12g. The inner diameter D1 (FIG. 3) of the intermediate cylindrical casing 12 is smaller than the inner diameter D2 of the upper end portion, so that a stepped annular ledge 12b is formed inside the casing 12. The upper end portion of the casing 12 is divided into two symmetrical arcuate wall portions by a pair of diametrically opposite slots 12c and 12d. These slots 12c and 12d are continuous with respective grooves 12e and 12f which are diametrically opposite each other on the outer peripheral surface of the side wall 12a and parallel to the longitudinal axis of the casing 12. Each of the grooves 12e and 12f extends from the corresponding slot 12c or 12d down the side wall 12a to the lower end of the casing 12. The casing 12 can be formed by the use of any known injection molding technique and is rigidly formed together with the stator member, including a dielectric ceramic plate 13 and a first terminal leg 10, during the injection molding.

Figure 4:
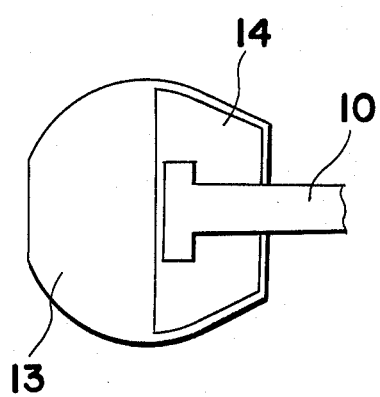
FIG. 4 is a bottom plan view of the stator member of the variable capacitor according to the present invention.
Figure 5:
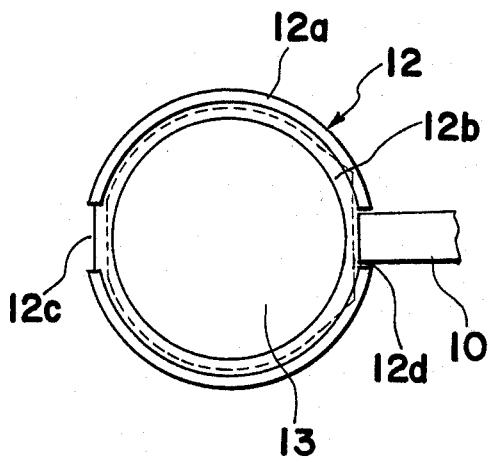
FIG. 5 is a top plan view of a casing molded with the stator member shown in FIG. 4.

The dielectric plate 13 as best shown in FIG. 4 has a configuration similar to a horse-shoe shape truncated in front and in back and has a portion of its bottom surface laminated with a film 14 of good conductive material, such as silver, by means of any known metal vapor deposition method. The film 14 is bonded or soldered to a leg 10 of conductive material. Since the size of the dielectric plate 13 when viewed from top is larger than the inner opening of the casing 12 defined by the diameter D1, as best shown in FIG. 5, the dielectric plate 13 is firmly positioned inside the side wall 12a of the cylindrical casing 12 while the entire bottom surface of the stator, except the portion in contact with the leg terminal 10, is held in contact with the bottom wall 12g of the casing 12. Therefore, the stator member, particularly the dielectric plate 13, is firmly held in position and can not undergo any motion.

Figure 6:
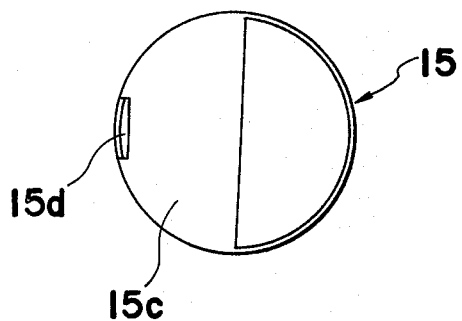
FIG. 6 is a bottom view of a rotator member accommodated in the casing of the variable capacitor.

The rotator member 15 is made of good conductive material having a low thermal expansion coefficient such as nickel alloy steel or brass, and has a disc shape. This rotator member 15 has, when viewed from bottom as shown in FIG. 6, a concave portion 15c and a projection 15d in said concave portion 15c (see also FIG. 2). It is preferable to make the projection 15d as small as possible for the reduction of minimum available capacitance. The rotator member 15 is further formed with a groove 15a (FIG. 2) extending diametrically on its upper surface; the ends of the groove are adjacent of the perimeter of the member 15. The groove 15a has an indicator notch 15b at its midpoint. The upper and lower surfaces of the rotator member 15 are well polished by means of lapping to facilitate smooth rotation inside the casing 12. Since the diameter of the rotator member 15 is slightly smaller than the inner diameter D1 of the casing 12, the rotator member 15 is rotatably accommodated in the casing 12, with the bottom surface except its concave portion 15c being held in sliding contact with the upper surface of the dielectric plate 13. It is to be noted that the edges of the rotator member 15, particularly the edges on the lower surface, are rounded to prevent the dielectric plate 13 from being scratched and, at the same time, to facilitate the insertion of the rotator member 15 into the casing 12.

Figure 7:
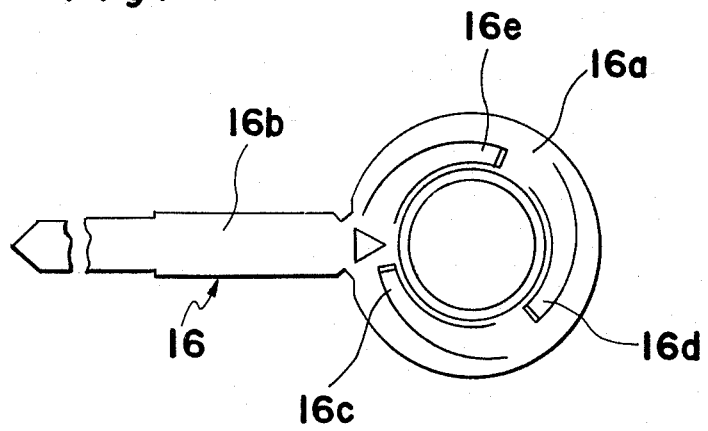
FIG. 7 is a top plan view of a cap member for the casing.

The cap member 16, as shown in FIG. 7, is made of metal and is constituted by a ring portion 16a and an elongated portion 16b serving as a second terminal leg. The ring portion 16a, in which a central opening is preferably formed by the use of any known blanking technique, has three arcuate integral elastic leaves 16c, 16d and 16e bent downwards, i.e., toward the rotator member 15. Since the outer diameter of the ring portion 16a is larger than the inner diameter D1 but smaller than inner diameter D2, when the ring 16a is placed in the casing 12 against the biasing force of the leaves 16c, 16d and 16e and held in contact with the upper surface of the rotator member 15, the ring 16a is supported on the stepped ledge 12b. When the cap member 16 is inserted into the casing 12 in the manner described above, the elongated portion 16b of the cap 16 extends outwardly from the casing through the slot 12c. Thus the ring portion 16a is prevented from being rotated in the casing 12 down.

Figure 8:
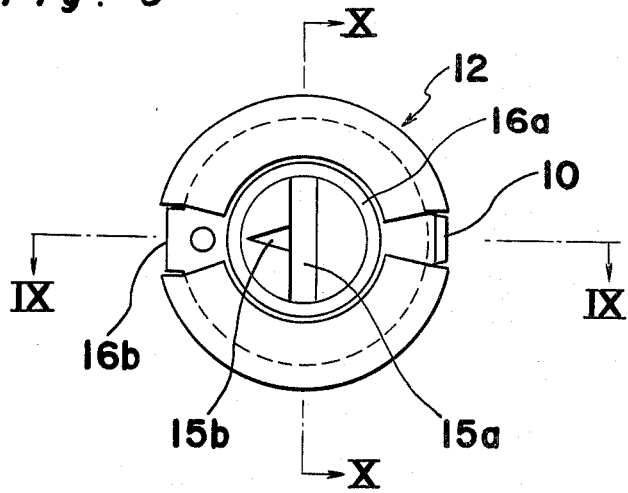
FIG. 8 is a top plan view of an assembled variable capacitor of the present invention.
Figure 9:
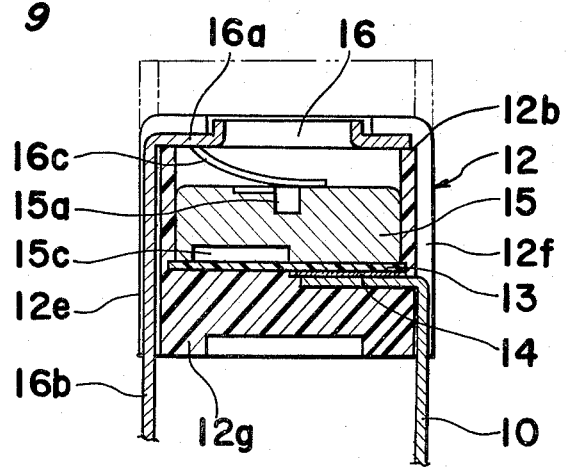
FIG. 9 is a cross-sectional view taken along a line IX—IX shown in FIG. 8.
Figure 10:
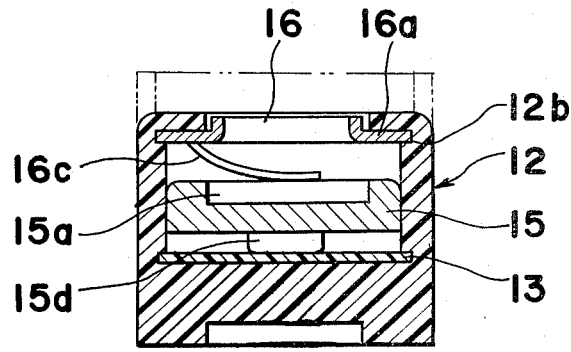
FIG. 10 is a cross-sectional view taken along a line X—X shown in FIG. 8.

The rotator member 15 and the cap member 16 thus placed inside the casing 12 are held in position by bending the upper end portion of the casing 12 in a manner shown in FIGS. 8 to 10, thus completing the variable capacitor of the present invention. This bending can be effected by the application of heat to soften the upper end portion of the casing 12. Furthermore, the first and second terminal legs 10 and 16b are bent down in a manner shown in FIG. 9 to lie within the grooves 12e and 12f, respectively, with the free ends of the respective legs 10 and 16b protruding downward from the bottom of the casing 12.

The operation of the variable capacitor is described hereinbelow.

Upon application of voltage across the first and second terminals 10 and 16b, the voltage appears across the dielectric plate 13, particularly, between the silver film 14 and the rotator member 15. The capacitance of the variable capacitor can be adjusted by rotating the rotator member 15 by means of a screw driver engaging the groove 15a in the rotator member 15. More specifically, the capacitance of the variable capacitor becomes maximum when the rotator member 15 is so rotated as to positioned the concaved portion 15c in offset relation to the silver film 14, that is, when the concave portion 15c of the rotatable member 15 is rotated as far away as possible from the silver film 14. On the other hand, the capacitance of the variable capacitor will become minimum when the concave portion 15c of the rotatable member 15 is located directly above the silver film 14. The indicator notch 15b formed on the upper surface of the rotator member 15 is provided for showing the position of the concave portion 15c relative to the film 14. Furthermore, by means of such groove 15b it is easy to identify the degree of rotation.

Figure 11:
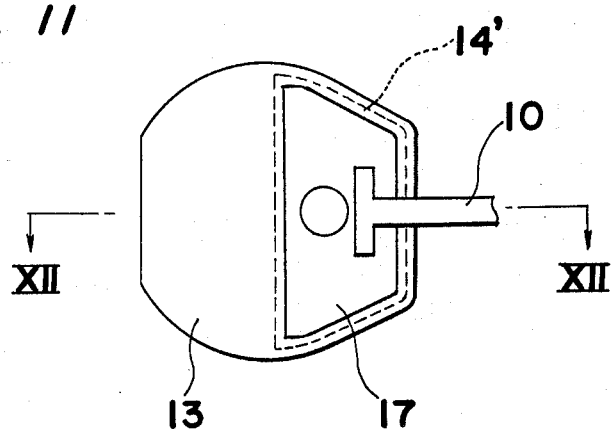
FIG. 11 is a bottom plan view of another embodiment of the stator member.
Figure 12:
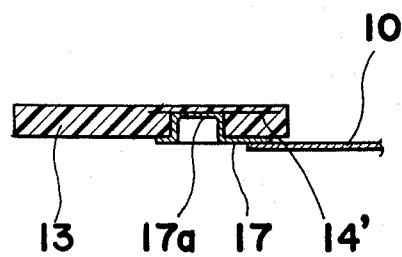
FIG. 12 is a cross-sectional view taken along a line XII—XII shown in FIG. 11.

Referring to FIGS. 11 and 12, there is shown a modification of the stator member to be rigidly molded in the casing 12. The stator member shown in FIGS. 11 and 12 has the silver film 14' embedded in the dielectric plate 13. The connection between the embedded silver film 14' and the terminal leg 10 is effected by a metal film 17 a portion 17a of which extends into a hole formed in the dielectric plate 13 to the depth of the film 14'. Since this hole in the dielectric plate 13 extends approximately halfway through the thickness of the plate 13 to the level of the silver film 14', the tip of the projection 17a is held in contact with the silver film 14' and electrically connects the silver film 14' with the terminal leg 10.

Figure 13:
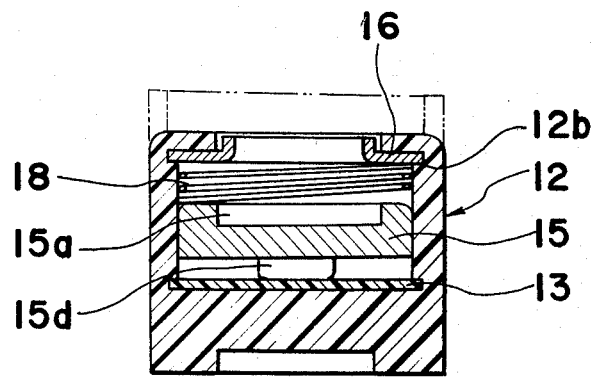

Referring to FIG. 13, there is shown a modification of the variable capacitor in which the rotator member 15 is urged downwards against the dielectric plate 13 by a coil spring 18 positioned between the rotator member 15 and the cap member 16 in place of the elastic leaves 16c, 16d and 16e of the first embodiment.

Since the terminal leg 10, according to the present invention, is rigidly assembled together with the casing through the step of molding, the soldering flux will not enter the casing during the soldering. Therefore, it is not necessary to provide a coating of resin on the outside of the casing 12, as is required in the prior art construction.

Furthermore, since the number of the component parts for the variable capacitor of the present invention is relatively small, a number of steps can be omitted from the assembly line and the adjustment procedures. Moreover, the cost for the manufacture thereof can be reduced without the performance being adversely affected.

Since the dielectric plate 13 is held stationary in the casing 12, there is no substantial possibility of its being cracked or chipped during the rotation of the rotator member 15. Furthermore, since the dielectric plate 13 is firmly retained in position by the molded casing, there is no substantial possibility that an external impact will displace it. In addition, since the dielectric plate 13 and the silver film 14 are securely connected to each other, there is no need to smoothen the contacting surfaces thereof.

Although the present invention has been fully described by way of examples with reference to the accompanying drawings, various changes and modifications will now be apparent to those skilled in the art. Therefore, these changes and modifications are, unless they depart from the true scope of the present invention as defined in the appended claims, to be understood as included therein.

What is claimed is:
1. A variable capacitor, comprising:
   (a) a dielectric plate having first and second flat major surfaces;
   (b) a film of electrically conductive material formed on said second surface of said dielectric plate and defining a stator member;
   (c) a first elongated terminal plate having one end electrically connected to said film;
   (d) a substantially cylindrical casing made of electrically nonconductive material and having a bottom wall and a substantially cylindrical side wall integral therewith and being open at the top, said first elongated terminal plate and said dielectric plate being directly embedded in said casing in such a manner that:
       (1) said first elongated terminal plate is maintained in contact with said film on said dielectric plate;
       (2) said dielectric plate is stationarily positioned inside said casing and non-rotatable with respect to said casing with said second flat major surface against said bottom wall;
       (3) said first major flat surface of said dielectric plate faces said open top of said casing; and
       (4) said elongated terminal plate extends outside of said casing through said cylindrical wall;
   (e) a disc shaped rotor member made of electrically conductive material and having first and second flat surfaces, said rotor member being rotatably accommodated in said casing with said first surface thereof being held in contact with said first flat major surface of said dielectric plate;
   (f) a cap member made of electrically conductive material, said cap member being secured to said open top end of said cylindrical casing and enclosing said rotor member inside aid casing; said cap member having an opening for affording access to the interior of said casing when said cap member is so secured; and said cap member being electrically connected to said rotor member;
   (g) spring means integral with said cap member and positioned between said cap member and said rotor member for urging said rotor member against said dielectric plate; and
   (h) a second elongated terminal plate integral with said cap member and having one end electrically connected to said cap member, and extending outside of said cylindrical casing.

2. A variable capacitor as claimed in claim 1, wherein said film is laminated on said second surface of said dielectric plate.

3. A variable capacitor as claimed in claim 1, wherein said film is embedded in said dielectric plate.

4. A variable capacitor as claimed in claim 1, wherein said cylindrical casing is molded together with said dielectric plate, said film and said first elongated terminal.

5. A variable capacitor as claimed in claim 1, wherein said disc shaped rotor member has a concavity portion in said first surface thereof.

6. A variable capacitor as claimed in claim 1, wherein the edges of said disc shaped rotor member adjacent said first surface of said rotor member are rounded.

7. A variable capacitor as claimed in claim 1, wherein said disc shaped rotor member has a groove formed diametrically across said second surface thereof.

8. A variable capacitor as claimed in claim 1, wherein said spring means comprises at least one leaf spring extending from said cap member.

9. A variable capacitor as claimed in claim 1, wherein said cap member and said second elongated terminal plate are continuously integral with each other and are constituted by a metal plate.

10. A variable capacitor as claimed in claims 1 or 9, wherein said dielectric plate, said film, said first and second elongated terminal plates, said disc shaped rotor, said cap member and said spring means are all located in the cylindrical space defined by said substantially cylindrical side wall of said casing.

11. A variable capacitor, comprising:
(a) a dielectric plate having first and second flat surfaces;
(b) a film of electrically conductive material in contact with said dielectric plate;
(c) a first elongated terminal plate having one end electrically connected to said film;
(d) a substantially cylindrical casing made of electrically non-conductive material and having a bottom wall and a substantially cylindrical side wall integral therewith, said first elongated terminal plate and said dielectric plate being directly embedded in said casing in such a manner that:
  (1) said first elongated terminal plate is maintained in contact with said film on said dielectric plate;
  (2) said dielectric plate is positioned inside said casing and stationarily located on said bottom wall of said casing and being non-rotatable with respect thereto; and
  (3) said first elongated terminal plate extends outside of said casing through said cylindrical wall;
(e) a disc shaped rotor member made of electrically conductive material and having first and second flat surfaces, said rotor member being rotatably accommodated in said casing with said first surface thereof being held in contact with said second flat surface of said dielectric plate;
(f) urging means for urging said rotor member against said dielectric plate; and
(g) a second elongated terminal plate integral with said urging means and having one end electrically connected to said rotor member.

* * * * *